2,850,370
Patented Sept. 2, 1958

2,850,370

PROCESS FOR TREATING MANGANESE GARNET ORE

Walter R. Trost, Ferguson's Cove, Nova Scotia, and Guy P. MacKay, Halifax, Nova Scotia, Canada No Drawing. Application October 29, 1956
Serial No. 618,688

4 Claims. (Cl. 75—7)

The present invention relates to a process for treating manganese garnet ore to convert the manganese therein to the easily recoverable pyrolusite form.

Manganese garnet ore is known as spessartite and is a double silicate of manganese and aluminium which may be represented by the formula $Mn_3Al_2(SiO_4)_3$. Manganese garnet ores are usually found along with silica and pyrites, and the direct separation of the spessartite from the silica is a difficult and commercially impractical operation since the two minerals have similar properties. Furthermore, even if spessartite could be concentrated, it would still not provide a commercial manganese concentrate, since the manganese constituent is only 33% of the mineral.

While there is a strong demand for manganese, and there are many known deposits of manganese garnet ore, these deposits generally lie unworked for the lack of an economically sound process for recovering the manganese therefrom.

We have approached the problem of beneficiating manganese garnet ore from what we believe to be a fresh direction and have found that we can directly convert the manganese in manganese garnet ore into an easily separable form without first passing through a garnet concentration process.

Our invention is based on the discovery that manganese can be recovered with facility from a manganese garnet ore by mixing the ore with an alkali and roasting the mixture in air until the manganese is converted into its dioxide ($MnO_2$) form, generally known as pyrolusite. Once the manganese is in this oxidized form it can be separated from the remainder of the mixture by established separatory procedures, e. g., mechanical separation, including tabling and flotation, and chemical extraction, including acid leaching. The alkalies we have found useful are NaOH, KOH, $Na_2CO_3$ and $K_2CO_3$. The roasting temperature may range from about 500° C. to about 900° C. and the time of roasting may be decreased as the roasting temperature is increased. Thus, for example, while a four minute roast suffices when a temperature of about 800° C. to 900° C. is employed, a roasting period of about one hour is recommended when the roasting temperature is in the region of 500° C.

By way of a recapitulation and summary of the foregoing, our invention may be generally defined as a process for treating an ore containing spessartite $Mn_3Al_2(SiO_4)_3$ to convert the manganese therein to the easily recoverable pyrolusite form, which comprises grinding the ore to about 30 mesh or less, mixing it with an alkali metal compound selected from the group consisting of NaOH, KOH, $Na_2CO_3$ and $K_2CO_3$, in an amount sufficient to provide approximately two atoms of the selected alkali metal for each atom of manganese present in the ore, and roasting the mixture in air at a temperature of from about 500° to about 900° C.

In the process of the invention, the alkali metal compound acts simultaneously to catalyze the oxidation of the manganese to the $MnO_2$ form and to displace the manganese from the mineral. The reaction is one in which Na or K atoms substitute for Mn atoms in the mineral, whilst the displaced Mn atoms are oxidized to $MnO_2$. Hence the requirement of the process is that two atoms of Na (or K) be added for each atom of Mn in the ore; the ratio of two to one being based on the combining powers of the sodium (or potassium) and the manganese in the ore. Provided the correct amount of alkali metal compound is added, the manganese is quantitatively released as easily-recoverable pyrolusite ($MnO_2$). If insufficient alkali metal compound is employed, only part of the manganese is converted into pyrolusite. If an excess of the alkali metal compound is added the spessartite absorbs it and then breaks down into water-soluble compounds viz. sodium silicate and sodium aluminate. If a still greater excess is employed the pyrolusite will be converted into a water-soluble manganate. The formation of any of these water-soluble compounds militates against the efficient recovery of manganese, either by interfering with the separation or causing manganese losses. From the foregoing it will be appreciated that the alkali metal compound should be in balance with the manganese in the ore, i. e. two atoms of Na or K should be added for each atom of Mn in the ore. Thus, for example, one would add two molecules of NaOH or KOH for each atom of Mn (or one molecule of $Na_2CO_3$ or $K_2CO_3$ for each atom of Mn).

During the roast the spessartite undergoes very definite chemical changes. The roasted product consists of fine dark powdery pyrolusite disseminated throughout a coarsely granulated, white, double silicate of aluminium and sodium (or potassium) which is insoluble in water and weak acids. As previously mentioned the pyrolusite is easily separated from the complex silicate, whereupon it may be employed directly in the pyrolusite form or it may be converted in metallic manganese.

While we have mentioned the possible use of four different alkali metal compounds we presently prefer to employ sodium hydroxide.

The process of the invention is particularly valuable where the ore being treated contains one or more valuable minerals in addition to the spessartite, and, as a matter of fact, the process of the invention was particularly developed for treating a quartzite rock containing both scheelite (a tungsten ore) and spessartite.

The processing of this particular ore will now be described by way of illustrating the invention.

The starting material was a quartzite containing 11.5% Mn, 7.0% Fe, 0.76% $WO_3$, 60% $SiO_2$, and 7.1% $SiO_2$ wherein the manganese was present as spessartite; the tungsten was present as scheelite, $CaWO_4$; the iron occurred as aresnopyrites, pyrites, and garnets; and the $SiO_2$ was present both as quartz and, when combined with $Al_2O_3$ as a garnet. The quartzite was ground to minus 30 mesh and the scheelite and pyrites were separated off by conventional procedure.

32 parts (by weight) of dry NaOH were ground together with 158 parts (by weight) of raw powdered residue of the scheelite recovery step. The ingredients were mixed dry, moistened, and ground again.

The moist ground mixture was then roasted in air at 800° C. for four minutes. 186 parts (by weight) of product was recovered in the form of a crumbly clinker. Analysis of the product showed it to contain 27.2 parts (by weight) of $MnO_2$. This represents conversion of 93% of the manganese to $MnO_2$. The efficiency of NaOH consumption was 77%, assuming that two Na atoms replace one Mn atom in the spessartite as the $MnO_2$ is formed. Working in the foregoing way, an ore containing 11.5% manganese fixed therein as spessartite was converted into a product containing 14.6% of easily separable $MnO_2$.

What we claim as our invention is:

1. A process for treating spessartite to convert the managnese therein to the easily recoverable pyrolusite form, which comprises grinding the ore to a fineness that will pass 30 mesh, roasting it in air with an alkali metal compound selected from the group consisting of NaOH, KOH, $Na_2CO_3$, in an amount sufficient to provide approximately two atoms of the selected alkali metal for each atom of manganese present in the ore, at a temperature of from about 500° C. to about 900° C.

2. A process for treating manganese silicate to convert the manganese therein to the easily recoverable pyrolusite form, which comprises grinding the ore to a fineness that will pass 30 mesh, roasting it in air with an alkali metal compound selected from the group consisting of NaOH, KOH, $Na_2CO_3$ in an amount sufficient to provide approximately two atoms of the selected alkali metal for each atom of manganese present in the ore, at a temperature of about 500° C. to about 900° C.

3. A process for treating manganese silicate to convert the manganese therein to the easily recoverable pyrolusite form, which comprises grinding the ore to a fineness that will pass 30 mesh, roasting it in air with NaOH in an amount sufficient to provide approximately two atoms of the selected alkali metal for each atom of manganese present in the ore, at a temperature of about 500° C. to about 900° C.

4. A process for treating manganese silicate to convert the manganese therein to the easily recoverable pyrolusite form, which comprises grinding the ore to a fineness that will pass 30 mesh, roasting it in air with NaOH in an amount sufficient to provide approximately two atoms of the selected alkali metal for each atom of manganese present in the ore, at a temperature of about 500° C. to about 900° C., wherein the roast is conducted for a period of from about four minutes up to about one hour, the length of the roast being varied inversely with the magnitude of the roasting temperature.

References Cited in the file of this patent

UNITED STATES PATENTS

| 2,435,304 | Foerster et al. | Feb. 3, 1948 |
| 2,775,517 | Mancke | Dec. 25, 1956 |

FOREIGN PATENTS

| 112,417 | Australia | Jan. 28, 1941 |